(12) United States Patent
Lang et al.

(10) Patent No.: US 6,361,178 B1
(45) Date of Patent: Mar. 26, 2002

(54) PIVOTABLE EXTERNAL REARVIEW MIRROR ASSEMBLY FOR UTILITY VEHICLES

(75) Inventors: Heinrich Lang, Ergersheim; Alfred Kolb, Marktbergel; Wolfgang Seiboth, Bad Windsheim; Albrecht Popp, Weihenzell, all of (DE)

(73) Assignee: Mekra Lang GmbH & Co. KG (DE)

( * ) Notice: Subject to any disclaimer, the term of this patent is extended or adjusted under 35 U.S.C. 154(b) by 0 days.

(21) Appl. No.: 09/115,198

(22) Filed: Jul. 15, 1998

(30) Foreign Application Priority Data

Aug. 7, 1997  (DE) .......................................... 197 34 169

(51) Int. Cl.⁷ ............................ G02B 7/182; G02B 5/08
(52) U.S. Cl. ...................... 359/872; 354/871; 354/875; 354/876; 354/843
(58) Field of Search ................................ 359/871, 872, 359/876, 843, 850, 865, 875, 841; 248/485, 487

(56) References Cited

U.S. PATENT DOCUMENTS

| | | |
|---|---|---|
| 473,919 A | 5/1892 | Edsall |
| 1,430,379 A * | 9/1922 | Hubbell ...................... 359/602 |
| 1,595,557 A | 8/1926 | Mamiya |
| 1,848,064 A | 3/1932 | Oishei |
| 2,458,117 A | 1/1949 | Tolbert |
| 2,569,144 A | 9/1951 | Benson |
| 2,783,015 A | 2/1957 | Kampa |
| 3,107,077 A | 10/1963 | Lassa |
| 3,339,876 A | 9/1967 | Kampa |
| 3,346,229 A | 10/1967 | Carson |
| 3,352,580 A | 11/1967 | Kurz et al. |
| 3,371,903 A | 3/1968 | Thompson |
| 3,372,897 A | 3/1968 | Lee |
| 3,384,334 A | 5/1968 | Malachowski |
| 3,448,553 A | 6/1969 | Herr et al. |
| 3,508,815 A | 4/1970 | Scheitlin et al. |
| 3,599,926 A | 8/1971 | Takahashi |
| 3,609,014 A | 9/1971 | Kurz |
| 3,637,186 A | 1/1972 | Greenfield |
| 3,784,149 A | 1/1974 | Brudy |
| 3,889,915 A | 6/1975 | Hashiguchi et al. |
| 3,936,158 A | 2/1976 | Cianciolo et al. |

(List continued on next page.)

FOREIGN PATENT DOCUMENTS

EP  0396930 A1 * 4/1990

OTHER PUBLICATIONS

Translation of EP–0396930 (Papke)*

*Primary Examiner*—Darren Schuberg
*Assistant Examiner*—Jennifer Winstedt
(74) *Attorney, Agent, or Firm*—Dority & Manning, P.A.

(57) ABSTRACT

A pivotable external rearview mirror assembly for vehicles is disclosed. The assembly includes a bearing arm including a bearing arm segment having a proximal end securable to the vehicle and a distal end extending from the proximal end. The bearing arm also includes a holding rod for supporting a rearview mirror housing. An articulation is secured to the distal end of the bearing arm segment and to a pivot end of the holding rod, the articulation pivotally joining the bearing arm segment and the holding rod. The articulation defines a swivel axis extending substantially horizontally in a direction substantially at a right angle to a direction of travel of the vehicle when the bearing arm is in a use position. The articulation is disposable adjacent a side of the vehicle when the bearing arm is in a use position so that the holding rod may pivot about the swivel axis in a plane extending in a direction substantially parallel to a direction of travel of the vehicle. The holding rod is pivotable upward to a position higher than a top boundary of a safety zone adjacent the vehicle.

12 Claims, 2 Drawing Sheets

U.S. PATENT DOCUMENTS

| | | |
|---|---|---|
| 4,077,597 A | 3/1978 | Greig |
| 4,125,244 A | 11/1978 | Lukey |
| 4,186,905 A | 2/1980 | Brudy |
| 4,254,931 A | 3/1981 | Aikens et al. |
| 4,422,724 A | 12/1983 | Otsuka et al. |
| 4,585,200 A | 4/1986 | Fisher |
| 4,592,529 A | 6/1986 | Suzuki |
| 4,623,115 A | 11/1986 | Brester |
| 4,693,571 A | 9/1987 | Kimura et al. |
| 4,699,024 A | 10/1987 | Iida et al. |
| 4,740,068 A | 4/1988 | Fisher |
| 4,764,004 A | 8/1988 | Yamada et al. |
| 4,778,265 A | 10/1988 | Fingerle et al. |
| 4,789,232 A | 12/1988 | Urbanek |
| 4,824,159 A | 4/1989 | Fluharty et al. |
| 4,877,319 A | 10/1989 | Mittelhauser |
| 4,896,859 A | 1/1990 | Polzer et al. |
| 4,929,074 A | 5/1990 | Urban |
| 4,934,802 A | 6/1990 | Fluharty et al. |
| 4,951,912 A | 8/1990 | Manzoni |
| 4,957,359 A | 9/1990 | Kruse et al. |
| 5,060,905 A * | 10/1991 | Sharp .................. 248/487 |
| 5,074,653 A | 12/1991 | Mittelhauser |
| 5,098,058 A | 3/1992 | Polzer et al. |
| 5,143,468 A | 9/1992 | Pausch |
| 5,210,652 A | 5/1993 | Perkinson |
| 5,330,149 A | 7/1994 | Haan et al |
| 5,337,190 A * | 8/1994 | Kogita et al. ............... 359/843 |
| 5,363,245 A | 11/1994 | Borello |
| 5,432,640 A | 7/1995 | Gilbert et al. |
| 5,436,769 A | 7/1995 | Gilbert et al. |
| 5,467,230 A | 11/1995 | Boddy et al. |
| 5,477,390 A | 12/1995 | Boddy et al. |
| 5,477,391 A | 12/1995 | Boddy |
| 5,483,385 A | 1/1996 | Boddy |
| 5,566,030 A * | 10/1996 | Yue .......................... 359/872 |
| 5,625,502 A | 4/1997 | Hoogenboom et al. |
| 5,657,174 A | 8/1997 | Boddy |
| D385,243 S | 10/1997 | Lang |
| 5,684,646 A | 11/1997 | Boddy |
| D387,317 S | 12/1997 | Lang |
| 5,703,731 A | 12/1997 | Boddy et al. |
| 5,703,732 A | 12/1997 | Boddy et al. |
| 5,786,948 A | 7/1998 | Gold |
| 5,880,895 A | 3/1999 | Lang et al. |
| 5,959,790 A | 9/1999 | Hemplemann |
| 6,019,475 A | 2/2000 | Lynam et al. |
| D431,508 S | 10/2000 | Matsumoto et al. |
| 6,174,062 B1 | 1/2001 | Schillegger et al. |

* cited by examiner

PIVOTABLE EXTERNAL REARVIEW MIRROR ASSEMBLY FOR UTILITY VEHICLES

BACKGROUND OF THE INVENTION

The present invention relates to an external rearview mirror assembly for the front of a utility vehicle, particularly a bus.

Utility vehicle mirrors are primarily external rear-view mirrors and must be at a distance of at least 2 meters (m) above the ground. If this is not the case, these mirrors must be able to give way in case of contact with an object or a person located outside the utility vehicle. Such mirrors are usually adjustable around a vertical axis. Experience has shown however that the mirrors are not reliably swiveled out of the way around this vertical axis in so-called pendulum impact tests.

OBJECTIVES AND SUMMARY OF THE INVENTION

It is therefore an objective of the present invention to provide an external mirror located in the safety zone of a utility vehicle, particular on the front of a bus, where the mirror is reliably swiveled out of the way in case of a pendulum impact.

This objective is attained by the characteristics of the invention. The mirror is either swiveled forward, in direction of travel, or against the direction of travel, and in every case up and out of the visual area by the swivel articulation with horizontal swivel axis extending at a right angle to the direction of travel, located above a predetermined safety zone.

Very simple and reliable means thus ensure reliable yielding of the mirror. The measures according to the invention have special significance with so-called dropped-frame buses which have a low overall height and on which the external mirrors are regularly found within the above-mentioned safety zone. Even with mirrors installed above a level of 2 meters (m), it is advantageous if the mirror yields around a horizontal axis in case of collision with persons or objects so that injury and/or damage can be avoided.

BRIEF DESCRIPTION OF THE DRAWINGS

Advantageous further developments and embodiments of the invention are given in the claims and in the following description of an example embodiment through the drawing.

DESCRIPTION OF THE PREFERRED EMBODIMENT

Figure 1:
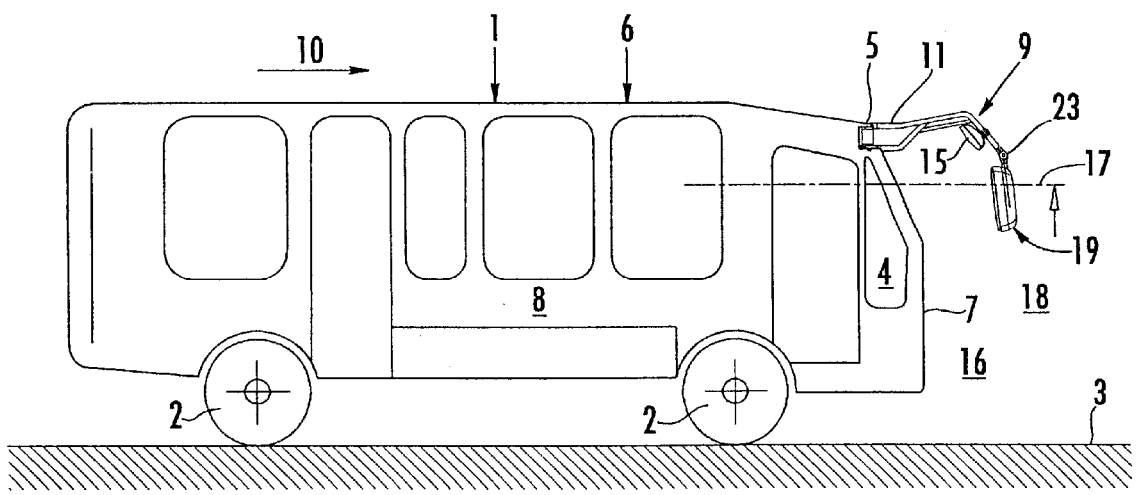
FIG. 1 shows a lateral view of a bus with a mirror system in a first embodiment of the present invention, FIG. 2 an enlargement of the mirror system shown in FIG. 1.
Figure 3:
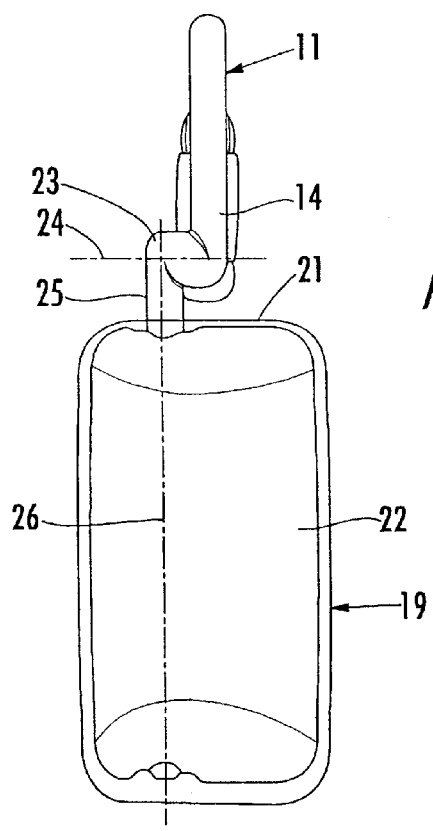
FIG. 3 shows a front view of a part of the mirror system of FIG. 1, from the perspective of the viewing arrow in FIG. 2.

Reference will now be made in detail to the presently preferred embodiment of the present invention, an example of which is illustrated in the drawings. The example is provided by way of explanation of the invention and is not meant as a limitation of the invention. For example, features illustrated or described as part of one embodiment can be used on another embodiment to yield yet a third embodiment. Accordingly, it is intended that the present invention include such modifications and variations.

The utility vehicle shown in FIG. 1 is a bus, which normally has a body 1 that is supported on a frame with wheels 2 on the ground 3. The driver's station is in the front area 4 of the bus. A mirror system (i.e., a mirror assembly) 9 which—as seen in the direction of travel 10—extends forward beyond the front 7 and to the right from the right side 8 is installed at in the transitional zone 5 between the roof 6 and the front 7 and the right side 8 of the body 1. On the left side—not shown on the drawing—an identical mirror system is installed in a symmetrical manner.

This mirror system 9 has a bearing arm 11, which is attached to the body 1 by means of a holder 12 in the above-mentioned transitional area 5, and is capable of being swiveled around a vertical axis 13. This bearing arm 11, which extends essentially at a right angle to the vertical axis 13, i.e., essentially horizontally and—as viewed in direction of travel 10, forward and to the side—is provided in its forward area with a bearing arm segment 14 that is bent down at an angle in its forward area. A so-called front mirror 15 is attached to the bearing arm segment 14 by which the driver is able to view the entire forward area 16 of the bus directly forward of front 7 as far as the ground 3. This front mirror 15 is located above a safety zone 18 indicated by line 17 above the ground 3. This safety zone 18 extends as far as line 17 over a predetermined safety distance which measures 2 meters (m) according to EC Guideline 71/127 (88/321)4.2.

Figure 2:
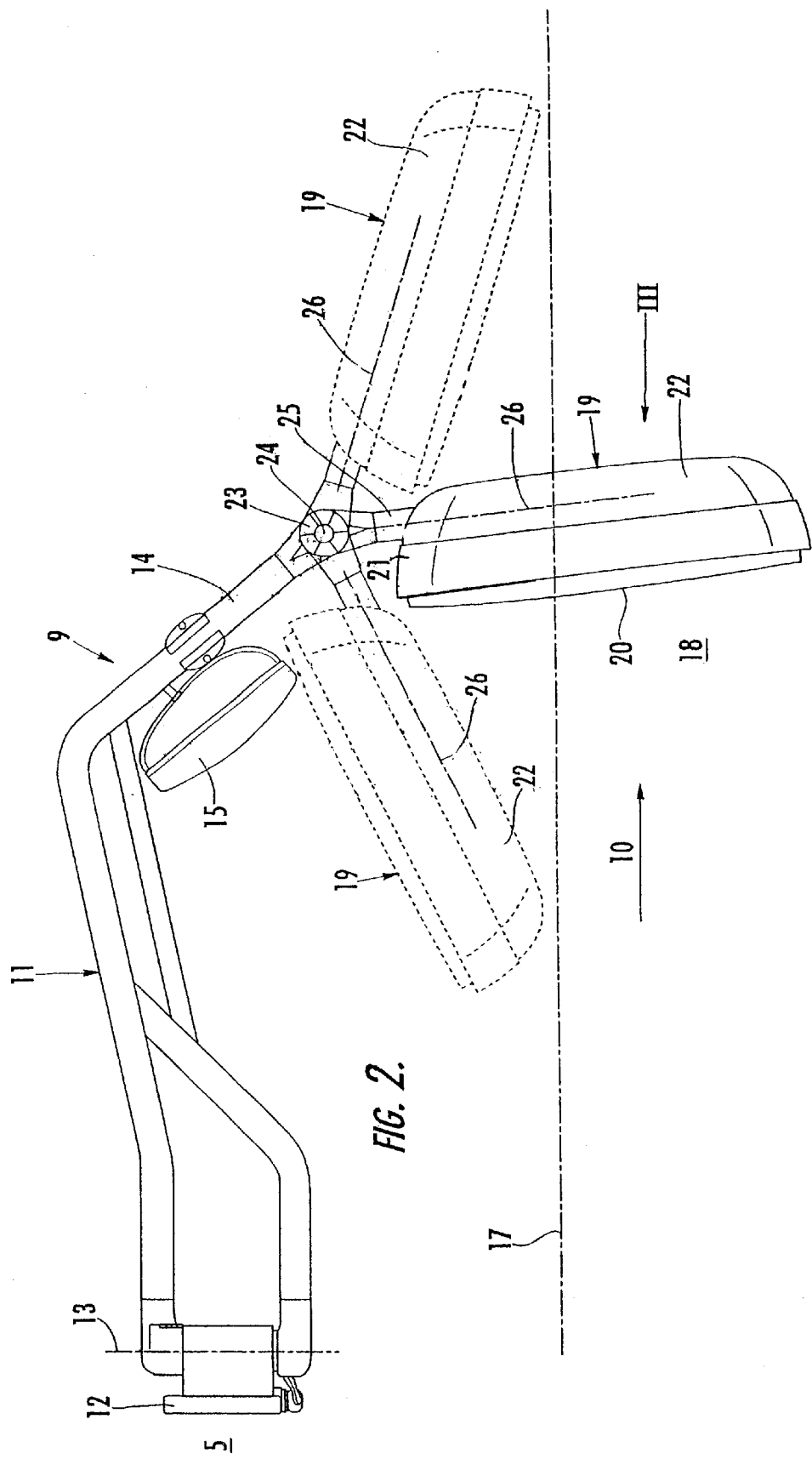

At the free end of the bent bearing arm segment 14, an external rear-view mirror 19 is installed. Its mirror side 20 extends in the extended operating position shown in FIG. 2 approximately in the vertical plane. This mirror 19 is articulately attached above the top 21 of its housing 22 by means of an articulation 23 to the end of bearing arm segment 14. This articulation 23 has a horizontal swivel axis 24 which extends at a right angle to the direction of travel 10. The mirror 19 can thus be swiveled in two directions—as indicated in FIG. 2 by lines with long and short dashes—i.e., towards the front 7 of the body, counter to the direction of travel 10, or away from the front 7 and forward in the direction of travel 10. In either case, the mirror is swiveled upwards so that the lowest point of the housing 22 after swiveling is located above the safety zone 18, i.e., at a distance of at least 2 meters (m) above the ground 3. This upward swiveling around the horizontal swivel axis 24 takes place when the mirror 19 collides with an obstacle, e.g., a passenger waiting at a bus stop or with some other obstacle.

The articulation 23 is configured so that when the mirror has been swiveled away from its operating position, the mirror remains in its swiveled position. For this purpose, the articulation 23 may be made alternatively in the form of a friction articulation, a snap-in articulation, or a ball articulation. In addition, an electric motor, which is not shown, can provide the means by which the mirror 19 can be swiveled away by the driver when approaching an obstacle or can be swiveled back into operating position following a swiveling event.

The articulation 23 is mounted on a holding rod 25, which is supported in housing 22 of the mirror 19, and which supports the mirror 19. The mirror 19 can be adjusted in the usual manner around the central longitudinal axis 26 of the holding rod 25 which extends substantially in a vertical direction when in operating position.

It will be apparent to those skilled in the art that various modifications and variations can be made in the present invention without departing from the scope and spirit of the invention. It is intended that the present invention include such modifications and variations as come within the scope of the appended claims and their equivalents.

What is claimed is:

1. A pivotable external rearview mirror assembly for a vehicle, the assembly comprising:

a bearing arm including a bearing arm segment having a proximal end securable to the vehicle and a distal end extending from the proximal end, the bearing arm also including a holding rod; and an articulation secured to the distal end of the bearing arm segment and to a pivot end of the holding rod, the articulation pivotally joining the bearing arm segment and the holding rod, the articulation defining a swivel axis extending substantially horizontally in a direction substantially at a right angle to a direction of travel of the vehicle when the bearing arm is in a use position, and the articulation being disposed adjacent a side of the vehicle such that when the bearing arm is in the use position the holding rod may pivot about the swivel axis in a plane extending in a direction substantially parallel to the direction of travel of the vehicle and such that the holding rod is yieldably pivotable upward about the swivel axis to a position higher than a top boundary of a safety zone adjacent the vehicle and substantially as high as the articulation after an impact with an object and configured to remain releasably pivoted upward.

2. The assembly of claim 1, further including a mirror housing disposed on the holding rod.

3. The assembly of claim 1, wherein the bearing arm segment is substantially horizontally pivotable relative to a holder along a substantially vertical axis, the holder disposed between a roof and a front of the vehicle.

4. The assembly of claim 1, wherein the top boundary of the safety zone is disposed about 2 meters above a ground on which the vehicle is disposed.

5. The assembly of claim 1, wherein the holding rod may pivot both in the direction of travel and opposite the direction of travel relative to the bearing arm segment.

6. The assembly of claim 1, further including a front mirror disposed on the bearing arm segment for providing a driver of the vehicle a view of an area in front of the vehicle.

7. A vehicle assembly, comprising:

a vehicle defining a side and an external side area disposed adjacent to and in front of the side;

a bearing arm including a bearing arm segment having proximal end securable to the vehicle and a distal end extending from the proximal end, the bearing arm also including a holding rod;

a rearview mirror housing disposed on the holding rod; and an articulation secured to the distal end of the bearing arm segment and to a pivot end of the holding rod, the articulation pivotally joining the bearing arm segment and the holding rod, the articulation defining a swivel axis extending substantially horizontally in a direction substantially at a right angle to a direction of travel of the vehicle when the bearing arm is in a use position, and the articulation being disposed in the external side area such that when the bearing arm is in the use position the holding rod may pivot about the swivel axis in a plane extending in a direction substantially parallel to the direction of travel of the vehicle and such that the holding rod is yieldably pivotable upward about the swivel axis to an impact position higher than a top boundary of a safety zone adjacent the vehicle and configured to remain yieldably pivoted upward.

8. The assembly of claim 7, further including a holder secured to the vehicle between a roof and a front of the vehicle and pivotably secured to the bearing arm segment.

9. The assembly of claim 8, wherein the bearing arm segment is substantially horizontally pivotable relative to the holder along a substantially vertical axis.

10. The assembly of claim 7, wherein the top boundary of the safety zone is disposed about 2 meters above a ground on which the vehicle is disposed.

11. The assembly of claim 7, wherein the holding rod may pivot both in the direction of travel and opposite the direction of travel relative to the bearing arm segment.

12. The assembly of claim 7, further including a front mirror disposed on the bearing arm segment for providing a driver of the vehicle a view of an area in front of the vehicle.

* * * * *